United States Patent [19]
del Castillo

[11] Patent Number: 4,674,708
[45] Date of Patent: Jun. 23, 1987

[54] AMPHIBIOUS DISCOIDAL AIRCRAFT

[76] Inventor: Gilbert del Castillo, 10803 Hazen Rd., Houston, Tex. 77072

[21] Appl. No.: 646,791

[22] Filed: Sep. 4, 1984

Related U.S. Application Data

[63] Continuation-in-part of Ser. No. 489,010, Apr. 27, 1983, abandoned.

[51] Int. Cl.⁴ ............................................. B64C 39/06
[52] U.S. Cl. ................................. 244/12.2; 244/23 C; 244/73 B; 244/53 B
[58] Field of Search .................... 244/12.2, 23 C, 73, 244/53 B, 52, 209

[56] References Cited

U.S. PATENT DOCUMENTS

| | | | |
|---|---|---|---|
| 2,718,364 | 9/1955 | Crabtree | 244/12.2 |
| 2,726,829 | 12/1955 | Hillis | 244/12.2 |
| 2,953,320 | 9/1960 | Parry | 244/12.2 |
| 3,181,811 | 5/1965 | Maksim, Jr. | 244/73 B |
| 3,347,496 | 10/1967 | Opfer, Jr. | 244/53 B |
| 3,355,124 | 11/1967 | Kelsey | 244/23 C |
| 3,397,853 | 8/1968 | Richardson, Sr. | 244/23 C |
| 3,442,469 | 5/1969 | Davis | 244/23 C |
| 3,514,053 | 5/1970 | McGuinness | 244/12.2 |
| 3,592,413 | 7/1971 | Thompson | 244/12.2 |
| 3,910,529 | 10/1975 | Putman | 244/53 B |
| 3,912,201 | 10/1975 | Bradbury | 244/230 |
| 3,946,970 | 3/1976 | Blankenship | 244/23 C |
| 4,146,202 | 3/1979 | Pender | 244/209 |

FOREIGN PATENT DOCUMENTS

| | | | |
|---|---|---|---|
| 492365 | 12/1975 | Australia | 244/23 C |
| 2242281 | 3/1974 | Fed. Rep. of Germany | 244/12.2 |
| 348617 | 4/1905 | France | 244/73 B |
| 788852 | 1/1958 | United Kingdom | 244/23 C |
| 1073542 | 6/1967 | United Kingdom | 244/73 R |

*Primary Examiner*—Galen Barefoot
*Attorney, Agent, or Firm*—Dula, Shields & Egbert

[57] ABSTRACT

An aircraft comprising a discoidal fuselage having a planar upper surface and containing at least one vertical duct extending longitudinally therethrough, an impeller located within the duct for producing an upward flow of gas, and a gas flow director movably mounted with respect to said duct. The vertical duct is central to the fuselage. The impeller is a vertical turbojet engine. The gas director comprises a central conical member, an upper annular flow control member, and a plurality of radially spaced apart vent controls. The vent controls are hydraulic cylinders. A hatch is mounted about the bottom opening of said duct. The hatch is movable such that one position seals the duct from the entry of liquids. An air passageway extends into and communicates with the duct.

17 Claims, 5 Drawing Figures

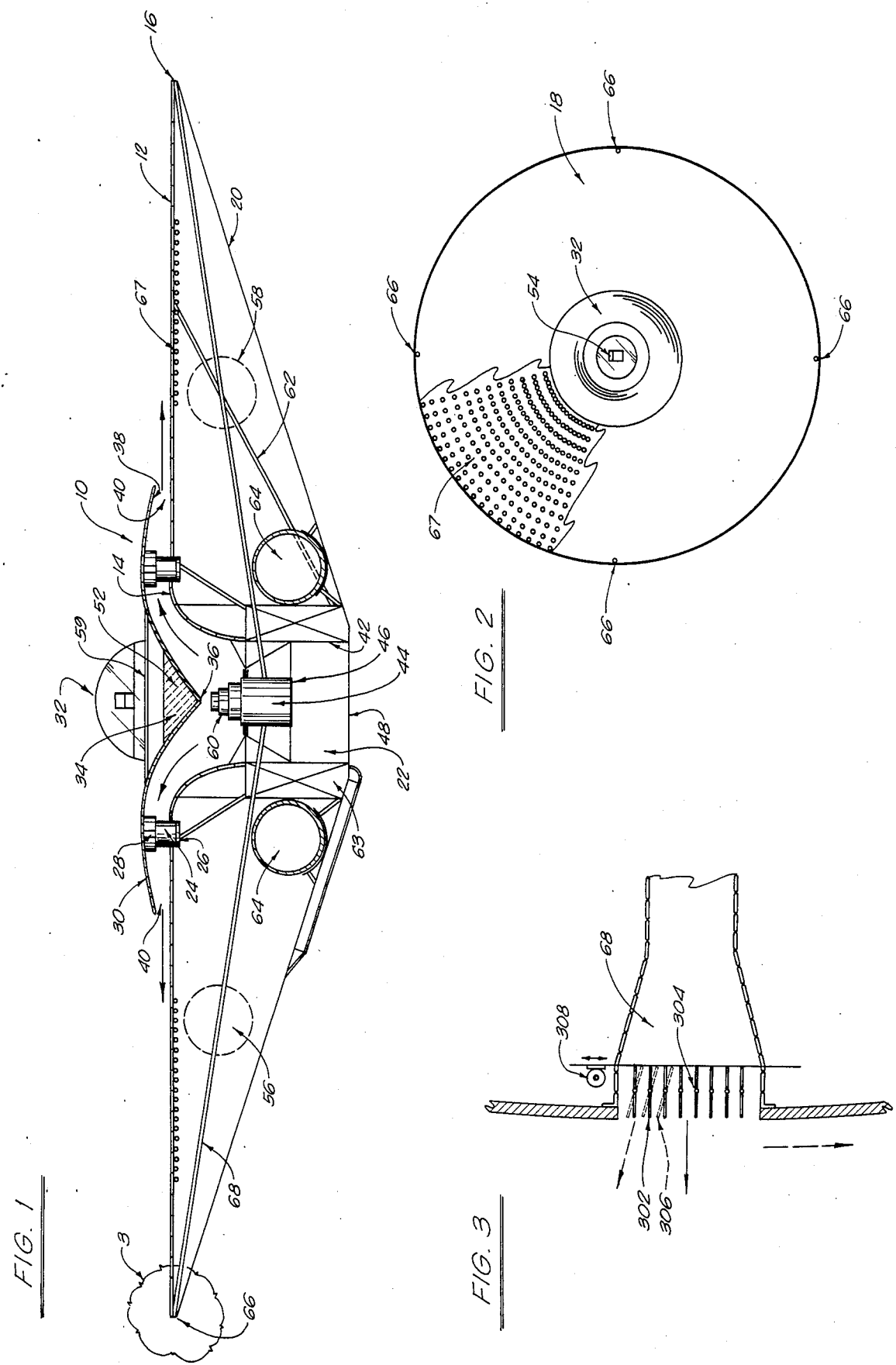

AMPHIBIOUS DISCOIDAL AIRCRAFT

RELATED APPLICATIONS

The present application is a continuation-in-part of U.S. patent application Ser. No. 489,010, filed on Apr. 27, 1983, now abandoned.

FIELD OF THE INVENTION

The present invention relates generally to aircraft, and especially to vertical lift aircraft having a substantially discoidal fuselage. More specifically, the present invention relates to amphibious discoidal aircraft.

BACKGROUND ART

There is a substantial amount of prior art in the field of discoid lifting bodies.

As early as Apr. 18, 1905, French Pat. No. 348,617, issued to Chaplet et al, for a discoid body wherein fluid under pressure, such as air or steam, exited through annular jets to flow over an aeroplane.

U.S. Pat. No. 3,073,551, to Bowersox, teaches a vertical lift aircraft having a parabolic wing and a top impeller. The impeller in Bowersox is fixed, which prevents it from steering the aircraft by preferentially directing airflow over the airfoil. Further, a top impeller, such as is taught by Bowersox, will cause icing of the parabolic wing in cold climates. Finally, Bowersox teaches a side-mounted cockpit, which substantially reduces pilot visibility.

Similarly, U.S. Pat. No. 3,041,009, to Wharton, teaches an aircraft having a discoid parabolic wing structure and a top impeller. Wharton is also subject to icing problems.

U.S. Pat. No. 2,108,652, to Coanda, teaches a slightly modified version of the external fluid supply discoid airfoil taught by Chaplet.

U.S. Pat. No. 2,978,216, issued in 1961, to Johnson, teaches a radial flow lift device wherein the pilot sits below a top-mounted impeller. Johnson uses a parabolic wing and a top impeller. Johnson also teaches external rudders and a fixed impeller, which is common to all prior art known to the inventor.

The closest and best prior art known to the inventor is U.S. Pat. No. 3,034,747, issued to Lent, in 1962, which teaches an aircraft with a discoid sustaining airfoil. Lent teaches a large number of embodiments, most of which are ground effects machines. Lent does however, as illustrated in its FIGS. 2 and 3, show a device whereby, to quote Lent, "another object of this invention is to provide a doughnut shaped craft having a circular wing of airfoil cross-section and means to pass a stream of air against said wing. The aerodynamic action of the air against the wing permitting the saucer doughnut-shaped craft not only to rise vertically but also to hover over the same position indefinitely or move sideways or in any other direction under the control of the navigator and crew." (Lent, Column 2, lines 53-61).

As compared to the present invention, Lent teaches a fixed impeller, a curved top airfoil, and does not teach peripheral inlets or control means.

Finally, U.S. Pat. No. 3,104,853, issued in 1963, to Kline, teaches a vertical take-off and landing airfoil having an impeller that draws air from both above and below the aircraft and directs it over an annular airfoil having an aerodynamic cross-section to lift the aircraft.

It is an object of the present invention to provide a substantially discoid vertical lift aircraft that avoids the icing problems encountered by previous similar aircraft.

It is a further object of the present invention to provide a substantially discoid vertical lift aircraft having a straight airfoil that is capable of making use of the jet exhaust from a turbo-jet engine to produce lift.

Yet still another purpose of the present invention is to provide a novel, frustoconical control means for directing the output of a turbojet engine in a controllable manner radially across a discoid airfoil.

Still yet another object of the present invention is to provide a substantially discoid vertical lift aircraft with the ability to use turbojet engines to produce lateral thrust.

Another advantage of the present invention is to provide an aircraft with amphibious ability.

Still other and further objects of the present invention will become evident upon reading the specifications and claims that follow.

SUMMARY OF THE PRESENT INVENTION

The present invention is an aircraft comprising a discoidal fuselage having a planar upper surface and at least one vertical duct, an impeller located within the duct for producing an upward flow of gas, and a gas flow director for controllably directing the flow of gas across the planar upper surface of the fuselage. The vertical duct is central to the fuselage. The impeller is a vertical turbojet engine. The gas director comprises a central conical member whose apex is located at the center of the gas flow from the turbojet engine, an upper annular flow control member, and a plurality of radially spaced apart vent controls attached to the flow control member and to the fuselage. The vent controller is a hydraulic cylinder having one end attached to the fuselage and the other end attached to the flow controller.

The aircraft of the present invention further comprises a rotation controller extending from the impeller to generally about the perimeter of the discoidal fuselage for controlling the yaw of the aircraft. This rotation controller comprises a plurality of fluid passageways having flow controls arranged generally about the opening of the fluid passageway about the perimeter of the aircraft. A plurality of hinged louvers are rotatably mounted about the opening.

The present invention also comprises amphibious conversion means attached to the discoidal fuselage and generally arranged about the duct. This amphibious conversion means comprises a hatch mounted at the bottom of the fuselage and an air supply passageway opening into the duct. The hatch is movable between a first position and a second position. The first position is a sealing position so as to isolate the duct from a fluid external to the aircraft. The second position allows the hatch to be moved away from the duct. The air supply passageway opens at the top of the gas flow director and extends through the fuselage. This air supply passageway opens to the duct at a location between the hatch and the first position and the impeller. This air supply passageway has louvers that are air pressure actuated. The vertical duct is a Kort nozzle extending into the impeller.

The aircraft of the present invention also includes landing gear that are rotatably mounted to the fuselage. This landing gear is of sufficient strength to support the weight of the aircraft about a surface. This landing gear comprises a plurality of arm-like members rotatably mounted at one end to the fuselage. These arm-like members are movable between a first and a second position.

A plurality of boundary layer controllers are arranged about the upper surface of the fuselage. These boundary layer controllers are for maintaining the flow of the gas adjacent to the planar upper surface of the fuselage. This boundary layer controller comprises a plurality of openings arranged about the upper surface of the fuselage so as to draw a portion of the gas passing over the fuselage thereinto.

BRIEF DESCRIPTION OF THE DRAWINGS

FIG. 1 shows a cross-sectional view taken across the diameter of the present invention;

FIG. 2 shows a plane view, looking down on the top of the present invention;

FIG. 3 shows a detail of the perimeter jet of the present invention taken from FIG. 1.

DESCRIPTION OF THE PREFERRED EMBODIMENT

Figure 4:
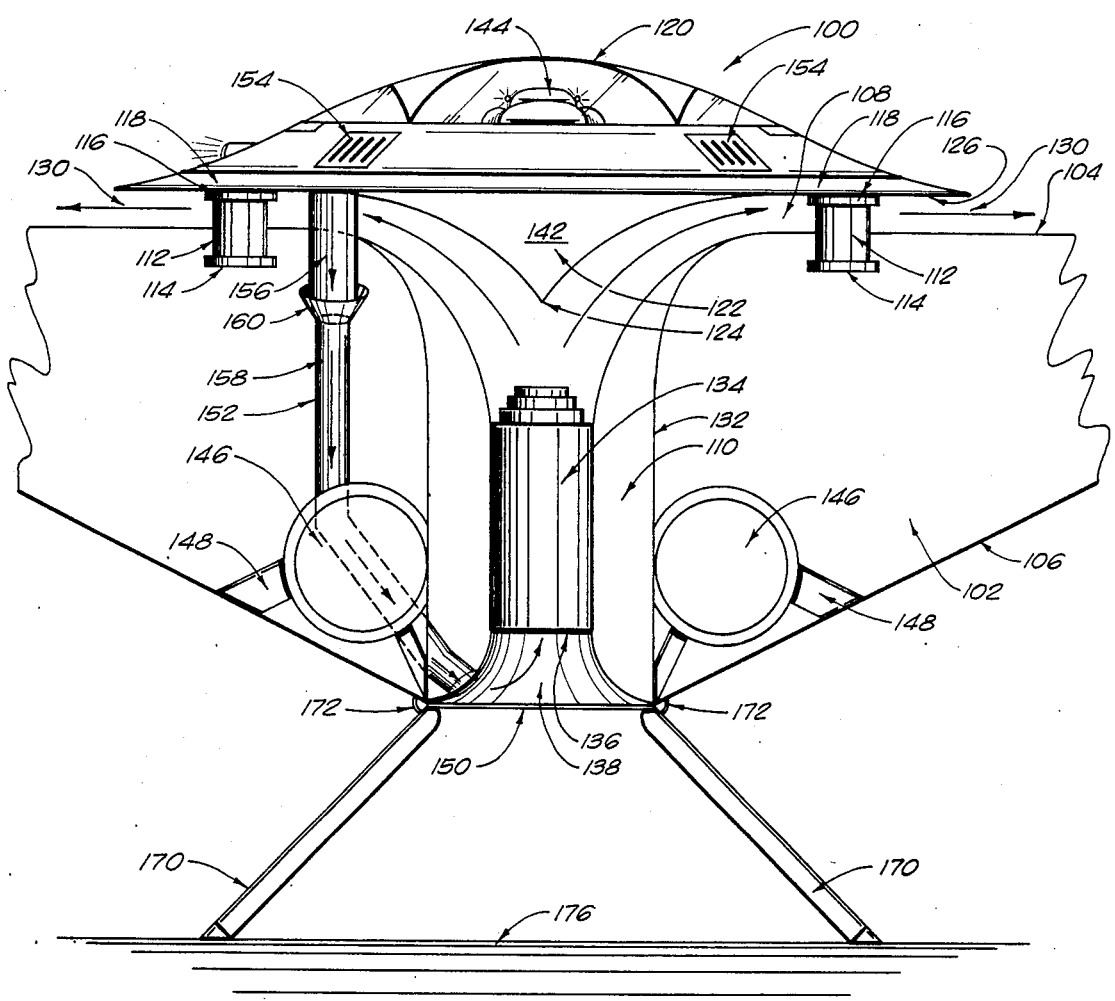
FIG. 4 is a partial cross-sectional view of an alternative embodiment of the amphibious version of the present aircraft.

FIG. 1 shows an aircraft 10 constructed according to a preferred embodiment of the present invention. Aircraft 10 includes a substantially discoidal fuselage 12. Fuselage 12 has an annular root 14 and perimeter 16. Fuselage 12 has an annular flat upper surface 18 and a lower straight annular surface 20. The annular inner root 14 of airfoil 12 defines a center passageway 22.

A plurality of hydraulic cylinders 24 are functionally connected at one end to a receiving well 26 in annular root 14. The effectuator end 28 of hydraulic cylinders 24 functionally engage the annular curved section 30 of frustoconical gas deflector 32. Frustoconical gas deflector 32 has a conical member 34 whose apex 36 and center of revolution 36 are on the center line of cylindrical opening 22.

The bottom surface 38 of annular curved deflector member 30 and the upper side 18 of airfoil 12 near root 14, define a variable geometry annular vent 40.

The lower part of annular root wing 14 defines the cylindrical walls 42 of passageway 22.

Passageway 22 is a Kort nozzle. The Kort nozzle increases the air mass flowing into the turbojet engine 44. As a result, greater altitude and speed can be achieved than could be achieved by turbojet engine alone.

A turbojet engine 44 is mounted with its inlet 46 near the bottom opening 48 of channel 22. Engine 44 is fixedly mounted within, and on the center line of, passageway 22 by thrust-mounting bracket assembly 50. Thrust-mounting bracket assembly 50 is attached by welding or other means to the outer casing of turbojet 44 and to the wall 42 of passageway 22. Conical gas deflecting member 34 is provided with an insulating layer 52. A cockpit and control section 54 rides on the center, symmetrically over the center line, which passes through turbojet 44 and apex 36 of frustoconical structure 32.

Two turbojet engines 56 and 58 are mounted in parallel and normal to the direction of turbojet engine 44. The inlets and outlets of these turbojets penetrate the discoid structure 12 of the present invention, whereby they may provide lateral thrust to the aircraft.

The outlet 60 of turbojet engine 44 is centered on approximate apex 36 of gas direction apparatus 34. Air passageways 62 open to the upper surface of discoidal fuselage 12. Passageways 62 extend through the body of aircraft 10 and communicate with the inlet passageway 22. The purpose of these air passageways 62 is to permit aircraft 10 to operate as an amphibious vehicle. When aircraft 10 is resting on a body of water, air can be drawn through passageways into the turbojet engine for allowing take-off and manuevering from or about that body of water. A suitable closure member (not shown) may be fitted over passageway 22 to prevent water from flowing into turbojet engine 44.

Fuel tanks 64 are also illustrated within wing 12.

The perimeter 16 of wing 12 is equipped with fluid vents 66, which are in fluid communication by fluid passageway 68 with the compressor stage of turbojet engine 44. Control structure 66 is shown in greater detail in connection with FIG. 3, below.

The entire aircraft may be made of aluminum, titanium, or any other material or composite material used in aircraft construction. Conical thrust deflector 34 is made of ceramic thermoshield material, which is well known to those skilled in the art of controlling hot gas.

FIG. 2 shows a plane view of the present invention, looking down on the top of the airfoil. The canopy and pilot's compartment 54 is shown sitting on top of frustoconical control surface 32. The upper surface 18 of annular airfoil 12 shows the position of the perimeter vents 66, which can control the rotation of the discoid aircraft. Boundary layer control vents 67 extend about the surface of discoidal fuselage 12. These boundary layer control vents 67 operate to regulate the flow over fuselage 12. These vents 67 operate to maintain the flow of gas generally adjacent to the planar upper surface of the fuselage. This is accomplished by drawing a portion of the gas into these openings. This enhances the stability and manueverability of aircraft 10.

FIG. 3 shows a detail taken from section 3 of FIG. 1, illustrating the louvered vents of the rotational control structure of the present invention. Vent 68, which is in fluid communication with the pressurized gas coming from engine 44, directs said gas to a plurality of louvers 302. Louvers 302 are hinged at their midpoints 304, and may be adjusted as shown in dotted outline 306, by prime mover 308, which may be an electric motor or a hydraulic actuator of the type that is commonly used to control aircraft flaps and leading edges.

Functionally, the present invention operates by drawing air inward through the bottom of channel 22 into the entry 46, of turbojet engine 44. The turbojet engine compresses and heats the gas and ejects it through outlet 60, whereupon it impinges on apex 36 of frustoconical control surface 34. The moving gases then directed into annular vent passageway 40, where its velocity may be controlled by adjusting hydraulic actuators 24, to tilt the frustoconical gas directing annular vent of the present invention to cause differing gas velocities across the top surface 18 of wing 12.

A portion of the hot gas from turbojet engine 44 passes through fluid lines 68 and out perimeter control means 66, whereupon the gas is directed by louvers 306 to controllably rotate the discoid aircraft of the present invention.

Turbojet engines 56 and 58 are mounted in parallel within the fuselage of the aircraft to provide lateral thrust.

FIG. 4 shows a partial cross-sectional view of an alternative embodiment of the present invention. It is believed that this alternative embodiment enhances the amphibious feature of the aircraft of the present invention.

From FIG. 4, aircraft 100 includes a substantial discoidal fuselage 102. Fuselage 102 has an annular flat upper surface 104. It also has a lower straight annular surface 106. The annular inner root 108 of fuselage 102 defines a central passageway 110.

A plurality of hydraulic cylinders 112 are functionally connected at one end to a receiving well 114 in annular root 108. The effectuator end 116 of hydraulic cylinders 112 functionally engages the section 118 of frustoconical gas deflector 120. Frustoconical gas deflector 120 has a conical member 122 whose apex 124 and center of revolution on the center line of cylindrical opening 110. The bottom surface 126 of deflector member 120 and the planar upper surface 104 of fuselage 102 define a variable geometry annular vent 130.

The lower part of annular root 108 defines cylindrical walls 132 of passageway 110. A turbojet engine 134 is mounted with its inlet 136 near the bottom opening 138 of passageway 110. Engine 134 is fixedly mounted within, and on the center line of, passageway 110 by suitable bracket assemblies, as described in connection with the previous embodiment. Conical gas deflecting member 122 is provided with an insulating section 142. A cockpit and control section 144 rides on the center, symmetrically over the center line, which passes through turbojet 134 and apex 124 of frustoconical structure 122. Fuel tanks 148 are included within fuselage 102 of aircraft 100. These circular fuel tanks 146 are positioned within the fuselage and maintained in position by bracket assemblies 148.

Generally, the embodiment of the present invention as shown in FIG. 4 is similar to that described in the previous embodiment. Suitable boundary layer control vents can be maintained about the planar upper surface 104 of this embodiment. The hydraulic cylinders 112 are actuated and operate to propel the craft in the same manner as described in connection with the previous embodiment. The yaw controls and venting structures are virtually identical to that of the previous embodiment. It is noted here, however, that the present embodiment of the present invention is more suitably adapted for amphibious operation.

The embodiment of FIG. 4 shows a hatch member 150 and air passageway 152 arranged about the fuselage 102 of aircraft 100. Hatch 150 is mounted about the bottom of fuselage 102. This hatch 150 is movable between a first position and a second position. The firt position is as shown in FIG. 4. In other words, hatch 150 provides a hermetic seal to prevent the entry of a fluid or liquid into inlet passageway 138. This allows the aircraft to land in water without the fear of water penetrating into the turbojet engine and inhibiting the flight of the vehicle. The hatch 150 may be moved into the second position which is away from the inlet passageway 110. Hatch 150 may be opened when aerodynamic flight of the aircraft 100 is desired. Hatch 150 may be designed in any number of ways presently known in the art. For example, hatch 150 may be of the type used on submarines or on any type of vehicle in which water or fluids are prevented from entry.

Air supply passageway 152 extends from inlet passageway 138. This air supply passageway extends upwardly through fuselage 102 and opens at the upper surface of gas deflector 120. A plurality of louvers 154 are arranged at the opening of air passageway 152 on the surface of deflector 120. These louvers 154 are pressure actuated such that the louvers open when air is drawn through air passageway 152 into impeller 134. A first section of tubing 156 extends from the louvers 154 to a location interior of fuselage 102. A second section of tubing 158 receives one end of tubing 156 and extends through the fuselage so as to open at the duct 138. A funnel-like opening 160 is arranged generally about the area of connection between tubing 156 and tubing 158. This funnel-like opening 160 allows articulated motion of tubing 156 with respect to the movement of deflector section 120 caused by hydraulic cylinders 112. The first and second sections of tubing 156 and 158 should be of a type that is heat and vibration resistant.

The basis for the inclusion of air passageways 152 is to enhance the ability of aircraft 100 to lift from a body of water. For example, in order to propel the vehicle, it is necessary to pass a flow of air over the planar surface of fuselage 102. When hatch 150 is closed, the only way to allow air to enter turbojet 134 is through air passageway 152. As a result of this arrangement, aircraft 100 can land on a body of water, draw air through louvers 154, through air passageways 152, and into turbojet 134. Thus, the aircraft can achieve flight from a body of water through the principles hereinbefore described. Water is prevented from entry into the turbojet 134 by the closure of hatch 150. Air flows through this arrangement in the directions indicated by arrows on FIG. 4. This arrangement also enhances the ability of the aircraft 100 to land in sandy or dusty areas.

The aircraft 100, as shown in FIG. 4, is also equipped with suitable landing gear 170. Landing gear 170 is rotatably mounted at point 172 to the bottom portion of fuselage 102. When aircraft 100 is in flight, landing gear 170 can be retracted and maintained in the position as shown by landing gear 174 of FIG. 1. However, when landing on surface 176, the landing gear 170 are rotated into the position shown in FIG. 4. Landing gear 170 represents a plurality of arm-like members that extend downwardly from fuselage 102. These arm-like members 170 support the weight of the aircraft 100 similar to the manner in which a tripod would support a camera or other object.

Figure 5:
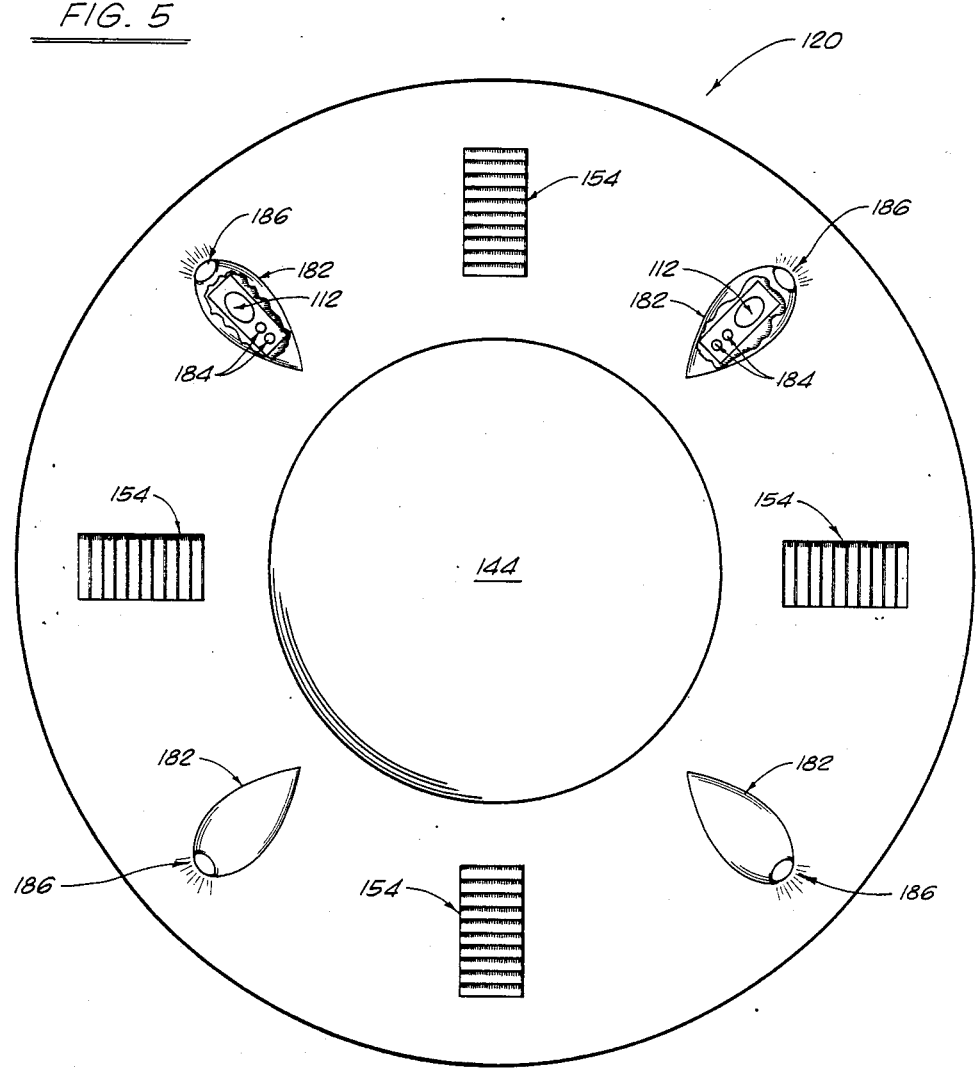
FIG. 5 is a top plan view of the alternative embodiment of FIG. 4.

FIG. 5 shows a top plan view of the gas deflector 120 as illustrated in FIG. 4. Deflector 120 has an essentially circular configuration. Cockpit 144 is located generally in the middle of deflector 120. A plurality of louvered vents 154 are arranged about the surface of deflector 120. These louvered vents 154 are pressure-actuated so as to open when air is drawn down through. Otherwise, these louvered vents are closed so as to provide for more suitable aerodynamic configuration. Protective housings 182 are maintained over the hydraulic cylinders 112. These protective housings provide for enclosures for protecting the integrity of the hydraulic cylinders and the associated wiring. Hydraulic cylinders 112 are maintained within protective housings 182. Electrical conduits 184 are similarly included within protective housings 182. Lights 186 are provided at locations on the protective housings 182.

The present invention offers a number of advantages not found in the prior art. First, the aircraft of the present invention is amphibious. This vehicle can land or fly from water. This vehicle is also suitably adapted for landing on sandy or dusty surfaces. This vehicle can land without the fear of water or sand entering the turbojet engine. This effect is further enhanced by the planar nature of the wing structure. This planar structure of the wing eliminates any ground effects caused by landing. Since all forces of air are passed over the planar wing structure, there should be little or no ground effect caused by the landing of the aircraft. The flow of the air over the top surface of the fuselage is directed parallel to the ground rather than directed at the ground. This eliminates the disastrous ground effects that can occur when the fuselage directs the air into the ground (or water). In the field of VTOL aircraft, the elimination of ground effects is extremely important. As an example, the crash of the helicopter on the mission to Tehran, Iran, during the hostage crisis, resulted from the ground effects caused by the helicopter blades interacting with the sand and dust on the earth. The ground effects, caused by the landing of all the aircrafts, stirred up enough sand to effectively cause the helicopter engine and transmission to fail and, thereby causing the crash of the hred up enough sand to effectively cause the helicopter engine and transmission to fail and, thereby causing the crash of the helicopter. In addition, ground effects create such turbulence that landing of such VTOL aircraft is difficult and is always highly objectionable to persons standing nearby. However, by the planar discoical wing configuration of the present invention, these ground effects are eliminated.

The present invention also has a major advantage in that it utilizes hydraulic linkages in order to effect a controllable thrust flow of air across the surface of the discoidal wing. This hydraulic cylinder enables the flow control member to be controllably maintained in a given position. These hydraulic cylinders prevent the "tea kettle" effect of less secure types of linkages. Such a linkage is a critical feature of the present invention in that it affords the present invention smooth, controlled, and maneuverable air flight.

The aircraft of the present invention is extremely useful where sonar is attached thereto. Typically, helicopters and other VTOL vehicles have been unable to incorporate sonar because of the interference caused by the rotating blades. However, the elimination of the rotating blades and the ground effects make the aircraft of the present invention suitable for the transportation and use of sonar.

The infrared signature of the present aircraft is very low. The highest temperature of the present invention is adjacent the exhaust of the turbojet engine. There is very little heat that shows from below the aircraft and only a small amount of heat from the exhaust area. Infrared detectors would have difficulty tracking the infrared image of the aircraft of the present invention.

The exhaust passing over the planar fuselage also eliminates the problems encountered by many aircraft with the buildup of ice. The present vehicle could operate in arctic environments since the constant passage of heated air over the planar surface of the wing would melt all ice accumulation and remove snow buildups.

Many embodiments of the present invention would be obvious to those skilled in the art of aircraft design. The present invention should not be limited to the specific embodiment shown above, but rather is limited only the appended claims and their legal equivalents.

I claim:

1. An aircraft comprising:
   a discoidal fuselage having a planar upper surface, said discoidal fuselage containing at least one vertical duct;
   impeller means located within said duct for producing an upward flow of gas;
   gas flow directing means for controllably directing said flow of gas across said planar upper surface of said fuselage;
   amphibious conversion means attached to said discoidal fuselage generally connected about said duct, said amphibious conversion means comprising:
   a hatch mounted about the bottom of said fuselage, said hatch movable between a first position and a second position; and
   an air supply passageway opening distal from said duct and extending generally into said duct for passing air into said impeller means.

2. An aircraft as in claim 1:
   wherein said vertical duct is central to said fuselage, said impeller means is a vertical turbojet engine, and said gas directing means comprises:
   a central conical member whose apex is located at the center of the gas flow from said turbojet engine,
   an upper annular flow control member attached to said conical member and overlapping the upper edge of said duct, whereby an annular vent is formed between said flow control member and said fuselage, and
   a plurality of radially spaced apart vent control means attached to said flow control member and said fuselage for controllably adjusting the size of said annular vent.

3. An aircraft as in claim 2, said vent control means comprises a hydraulic cylinder having one end attached to said fuselage and the other end attached to said flow control member.

4. An aircraft as in claim 2 further comprising rotation control means extending from said impeller means to generally about the perimeter of said discoidal fuselage for controlling the yaw of said aircraft.

5. An aircraft as in claim 4, said rotation control means comprising a plurality of fluid passageways having flow control means arranged generally about the opening of said fluid passageway about the perimeter of said aircraft.

6. An aircraft as in claim 5, said flow control means comprising a plurality of hinged louvers rotatably mounted about said opening, said rotation control means comprising four of said fluid passageways arranged at 90 degree angles with respect to said discoidal fuselage.

7. The aircraft of claim 1, said hatch in said first position for sealing said duct from the passage of a liquid thereinto, said second position being away from said duct.

8. The aircraft of claim 1, said air supply passageway opening at the surface of said gas flow directing means, said air supply passageway extending through said fuselage, said air supply passageway opening to said duct at a location between said hatch and said first position and said impeller means.

9. The aircraft of claim 1, said air supply passageway having louvers at said opening distal from said duct, said louvers being air pressure-actuated.

10. The aircraft of claim 1, said vertical duct being a Kort nozzle extending to said impeller means.

11. The aircraft of claim 1, said air supply passageway comprising:
- a first section of tubing extending from the surface of said gas flow directing means to a location interior of said fuselage; and
- a second section of tubing opening at one end to the end of said first section of tubing in said fuselage, said second section of tubing extending through said fuselage so as to open at said duct.

12. The aircraft of claim 11, said first and said second sections of tubing being comprised of heat and vibration resistant material.

13. The aircraft of claim 1, said aircraft further comprising:
- landing means rotatably mounted to said fuselage, said landing means for supporting the weight of said aircraft on a surface.

14. The aircraft of claim 13, said landing means comprising a plurality of arm-like members rotatably mounted at one end to said fuselage, said member movable between a first and a second position.

15. The aircraft of claim 1, said planar upper surface of said fuselage including boundary layer control means arranged thereon, said boundary layer control means for maintaining said flow of said gas adjacent said planar upper surface of said fuselage.

16. The aircraft of claim 15, said boundary layer control means comprising a plurality of openings arranged about said planar upper surface, said openings for drawing a portion of said gas thereinto.

17. An aircraft comprising:
- a discoidal fuselage having a generally planar upper surface, said discoidal fuselage containing at least one vertical duct;
- impeller means located within said duct for producing an upward flow of gas;
- gas flow directing means for controllably directing flow of gas across said generally planar upper surface of said fuselage;
- sealing means connected about the bottom of said discoidal fuselage and arranged so as to be interactive with the opening of said vertical duct about the bottom of said discoidal fuselage;
- an air supply passageway opening at a location distal from said duct and extending generally into said duct for passing air into said impeller means; and
- a hatch being movable between a first and a second position, said first position for sealing said duct from the passage of a liquid thereinto, said second position of said hatch being away from said duct, said air supply passageway opening at the surface of said gas flow directing means, said air supply passageway extending through said fuselage and opening to said duct at a position between said hatch in said first position and said impeller means.

* * * * *